J. F. McGUIRE.
LEVELING DEVICE FOR TRACTION ENGINES.
APPLICATION FILED MAY 14, 1913.
1,108,203.
Patented Aug. 25, 1914.
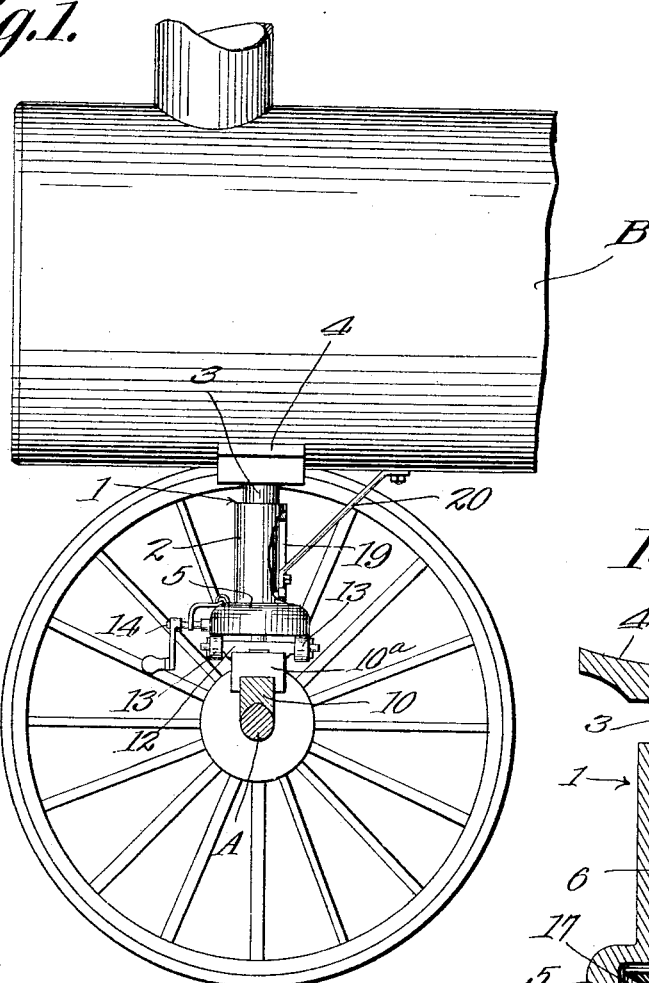
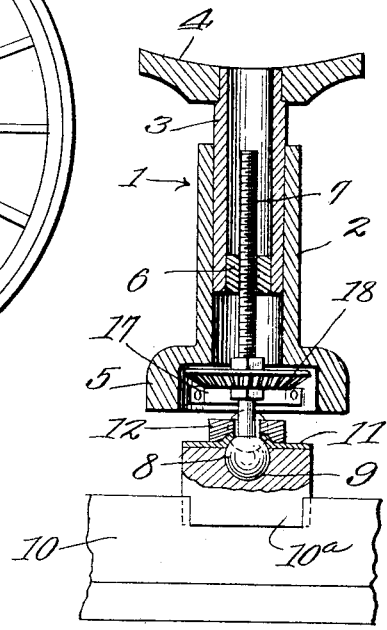
John F. McGuire, Inventor,
by C. A. Snow & Co.
Attorneys.

UNITED STATES PATENT OFFICE.

JOHN FRANCIS McGUIRE, OF PENDER, NEBRASKA.

LEVELING DEVICE FOR TRACTION-ENGINES.

1,108,203.  Specification of Letters Patent. Patented Aug. 25, 1914.

Application filed May 14, 1913. Serial No. 767,697.

*To all whom it may concern:*

Be it known that I, JOHN FRANCIS MC-GUIRE, a citizen of the United States, residing at Pender, in the county of Thurston and State of Nebraska, have invented a new and useful Leveling Device for Traction-Engines, of which the following is a specification.

The present invention appertains to a leveling device for traction engines and other vehicles, and is particularly designed for permitting the boiler to be leveled in order to eradicate the numerous objections existing in ordinary traction engines when standing on an uneven or inclined surface.

It is the object of the present invention to provide a novel and improved standard for supporting the front end of the boiler on the front or steering axle, and being so constructed and operable as to permit of the vertical adjustment of the front end of the boiler in order that it may be leveled under the various conditions.

Another object of the present invention is to provide novel means for permitting the front or steering axle to vibrate vertically due to unevenness in the surface traversed, and to permit the axle to be readily swung or turned for purpose of steering the traction engine or vehicle.

The present invention also comprehends the provision of a device of the nature indicated which shall be comparatively simple, compact, substantial, durable and inexpensive in construction, as well as convenient, efficient and serviceable in its use.

With the foregoing and other objects in view which will be apparent as the description proceeds, the present invention resides in the combination and arrangement of parts and in the details of construction hereinafter described and claimed, it being understood that changes in the precise embodiment of the invention can be made without departing from the spirit of the invention.

The invention has been illustrated in its preferred embodiment in the accompanying drawing, wherein:—

Figure 1 is a fragmental side elevation of a traction engine embodying the improved device. Fig. 2 is a vertical or longitudinal section of the adjusting device, and Fig. 3 is a bottom view of the standard.

As illustrated in Fig. 1, the traction engine to which the device is applied, embodies the boiler B, the front or steering axle A having the steering wheels journaled upon its ends, although it is understood that the present device is applicable to other portable steam engines or the like.

In carrying out the invention, there is provided the standard 1 embodying the telescopic parts 2 and 3, the outer part 2 being in the form of a sleeve or being tubular, and the inner part 3 also being tubular or having a longitudinal bore. The part or section 3 of the standard is uppermost, and carries a head 4 at its upper end adapted to be bolted or otherwise secured to the bottom of the boiler B adjoining its front end. The lower part or the sleeve 2 is provided with the apron or bell 5 at its lower end, and which is preferably integral therewith. A nut 6 is engaged within the lower end of the member 3, and a threaded spindle or screw 7 is threaded through the nut 6 and is provided at its lower end with a spherical head 8 engaging within a depression 9 provided in a block $10^a$ secured on the bolster 10. A cap 11 is secured on the block $10^a$ and engages over the head 8, so that the spindle or screw 7 and block $10^a$ have a ball and socket joint. The bolster 10 is provided with a lower longitudinal groove or channel adapted to engage over the axle A, it being understood that the bolster 10 is applicable to various axles.

An auxiliary or supplemental axle 12 is secured on the block $10^a$ over the cap 11 and is arranged at quadrature to the axle A or longitudinally of the engine. The auxiliary axle 12 has the wheels or rollers 13 journaled to its ends, these wheels or bearings engaging the rim of the apron or bell 5 and thereby constraining the axle from vibrating rearwardly and forwardly, but permitting the axle to vibrate vertically and to rotate or swing in a horizontal plane for purposes of steering.

A shaft 14 is journaled through one side of the apron or bell 5, a bushing 15 being fitted through the side of the apron or bell for the passage of the shaft 14, and to the inner end of the shaft 14, there is keyed a pinion 16. The inner end of the shaft 14 is supported by means of a chordal bar 17 secured at its ends to the apron or bell 5 and receiving the end of the shaft 14 at a central point. The pinion 16 is connected with a crown wheel or gear 18 secured to the spindle or shaft 7 within the apron or bell 5, the crown wheel or gear being keyed or otherwise secured to the spindle or shaft 7 to rotate therewith.

The sleeve 2 is provided with a longitudinal slot 19 in its rear side, and a brace 20 is secured at one end to the lower end of the member 3 and at its other end to the bottom of the boiler in rear of the head 4, the brace 20 passing through the slot 19. It will be noted that the brace 20 not only serves to brace the standard 1, but also constrains the sleeve or lower part 2 of the standard from rotating with respect to the member 3.

The outer end of the shaft 14 is squared or otherwise fashioned for the engagement of a suitable crank or other actuating member for manually rotating the shaft 14, although, if desired, the shaft 14 may be geared or otherwise operably connected to a hand wheel at the rear end or other portion of the traction engine for conveniently adjusting the device while the traction engine is moving or in transit.

In use, it will be evident that the standard 1 effectively supports the boiler from the axle, and is readily applicable in various traction engines or other vehicles, the ball and socket joint between the shaft or screw 7 and the bolster permitting the ends of the axle to vibrate due to unevenness in the soil or underlying surface, and also permitting the axle to be turned for purpose of steering. It is to be noted, however, that the axle is constrained from vibrating rearwardly and forwardly due to the fact that the wheels or rollers of the supplemental or auxiliary axle 12 engage the rim of the apron or bell 5. The rollers 13, although they prevent the vibration of the axle, as specified, permit the axle to readily turn or swing in a horizontal plane, and will also permit the axle to vibrate vertically. The weight of the boiler will be transmitted to the axle through the medium of the members 3 and 7, the sleeve or member 2 being constrained against longitudinal movement with respect to the shaft or screw 7, for the reason that the crown wheel or gear 18 has its rim or periphery disposed between the pinion 16 and lower end sleeve 2 proper. When it is desired to adjust the boiler, it is merely necessary to rotate the shaft 14 in the proper direction, which in turn will rotate the screw 7, and this screw in screwing through the nut 6, will either raise the member 3 or permit the same to gravitate, to thereby adjust the boiler as desired.

The many disadvantages incident to permitting the boiler to stand unlevel, are well known in the art, and need not be itemized, it being noted that the objections or disadvantages are overcome by the provision of the present device, and it being noted that the present device provides for those characteristics most desirable.

Particular attention is directed to the fact that the ball and socket joint between the screw 7 and the bolster will permit the screw to be readily rotated, the ball and socket joint reducing the friction to a minimum.

What is claimed is:—

1. In a device of the character described, a bolster, a pair of members adjustably connected, one of the said members having a ball and socket joint with the bolster, and the other member being attachable to an object to support the same, a sleeve telescoping over the last mentioned member and movable longitudinally with the first mentioned of said members and having a bell at its lower end, and bearings carried by the bolster at quadrature to the bolster and engaging the rim of the bell.

2. In a device of the character described, a bolster, a screw loosely connected thereto, a supporting member in threaded engagement with the screw, a sleeve telescoping over the said member having a bell at its lower end, a gear secured to the screw within the bell, a shaft journaled through one side of the bell, and a gear secured to the inner end of the shaft and meshing with the aforesaid gear.

3. In a device of the character described, a bolster, a screw loosely connected thereto, a supporting member in threaded engagement with the screw, a sleeve telescoping over the said member and having a bell at its lower end, bearings carried by the bolster on an axis at quadrature to the bolster, and engaging the rim of the bell, and means passing through one side of the bell and operatively connected to the screw for rotating the same.

4. In a device of the character described, a bolster, a screw loosely connected thereto, a supporting member in threaded engagement with the screw, a sleeve telescoping over the aforesaid member having a lower bell, an auxiliary axle carried by the bolster at quadrature thereto, rollers journaled to the ends of the auxiliary axle and engaging the rim of the bell, a gear secured to the screw within the bell, a shaft journaled through one side of the bell, and a gear secured to the inner end of the shaft and intermeshing with the aforesaid gear.

5. In combination with a boiler, a bolster, a screw loosely connected thereto, a supporting member in threaded engagement with the screw and secured to the boiler, a sleeve telescoping over the supporting member and having a longitudinal slot therein, a brace secured to the boiler and supporting member and passing through the said slot, and means carried by the sleeve and operably connected to the screw for rotating the same.

In testimony that I claim the foregoing as my own, I have hereto affixed my signature in the presence of two witnesses.

JOHN FRANCIS McGUIRE.

Witnesses:
 FRED AMMONS,
 WM. VOGT, Jr.

---

Copies of this patent may be obtained for five cents each, by addressing the "Commissioner of Patents, Washington, D. C."